US012177036B2

(12) United States Patent
Almehio et al.

(10) Patent No.: US 12,177,036 B2
(45) Date of Patent: Dec. 24, 2024

(54) METHOD FOR MANAGING IMAGE DATA, AND VEHICLE LIGHTING SYSTEM (71) Applicant: VALEO VISION, Bobigny (FR)

(72) Inventors: Yasser Almehio, Bobigny (FR); Constantin Prat, Bobigny (FR); Matthieu Drezet, Bobigny (FR)

(73) Assignee: Valeo Vision, Bobigny (FR)

(*) Notice: Subject to any disclaimer, the term of this patent is extended or adjusted under 35 U.S.C. 154(b) by 127 days.

(21) Appl. No.: 17/919,684

(22) PCT Filed: Apr. 22, 2021

(86) PCT No.: PCT/EP2021/060606
§ 371 (c)(1),
(2) Date: Oct. 18, 2022

(87) PCT Pub. No.: WO2021/214260
PCT Pub. Date: Oct. 28, 2021

(65) Prior Publication Data
US 2023/0188379 A1    Jun. 15, 2023

(30) Foreign Application Priority Data
Apr. 23, 2020   (FR) ..................... 2004087

(51) Int. Cl.
*H04L 12/40*  (2006.01)
*B60Q 1/14*   (2006.01)
(Continued)

(52) U.S. Cl.
CPC .......... *H04L 12/40* (2013.01); *B60R 16/0315* (2013.01); *H05B 47/105* (2020.01);
(Continued)

(58) Field of Classification Search
CPC ........... H04L 12/40; H04L 2012/40215; H04L 12/40032; B60R 16/0315; H05B 47/105; H05B 47/155; H05B 45/00; B60Q 1/1407
See application file for complete search history.

(56) References Cited

U.S. PATENT DOCUMENTS 10,391,927 B2   8/2019  Lahmer
10,870,386 B2   12/2020 Muramatsu
(Continued)

FOREIGN PATENT DOCUMENTS

| | | |
|---|---|---|
| CN | 206884861 U | 1/2018 |
| JP | 2004104529 A | 4/2004 |

(Continued)

OTHER PUBLICATIONS

Japan Patent Office, Office Action (with machine translation) of corresponding Japanese Patent Application No. 2022-562896, dated Nov. 7, 2023.
(Continued)

*Primary Examiner* — Abdullah A Riyami
*Assistant Examiner* — Syed M Kaiser
(74) *Attorney, Agent, or Firm* — Valeo Vision (57) ABSTRACT

A method for managing image data in a vehicle lighting system, the lighting system including a lighting module and a multiplexed bus for transmitting compressed image data to the lighting module. The method includes receiving an instruction to trigger a lighting function, the lighting function being configured to be generated by the lighting module from compressed image data corresponding to lighting patterns having L rows, L being an integer. Determining the image data to be compressed from among the image data of the lighting patterns of the at least one lighting function by selecting the image data of X rows from the L rows of the lighting patterns, X being an integer smaller than L. Com- (Continued)

pressing the image data determined as having to be compressed. Transmitting the compressed image data to the lighting module via the multiplexed bus in order for the lighting function to be generated and projected.

14 Claims, 6 Drawing Sheets

(51) Int. Cl.
 *B60R 16/03* (2006.01)
 *H05B 45/00* (2022.01)
 *H05B 47/105* (2020.01)
 *H05B 47/155* (2020.01)
(52) U.S. Cl.
 CPC ......... *H05B 47/155* (2020.01); *B60Q 1/1407* (2013.01); *H04L 2012/40215* (2013.01); *H05B 45/00* (2020.01)

(56) References Cited

U.S. PATENT DOCUMENTS

| | | | | |
|---|---|---|---|---|
| 2015/0077597 | A1* | 3/2015 | Furuta | H04N 25/62 348/242 |
| 2020/0084854 | A1* | 3/2020 | Bonne | H05B 45/10 |
| 2023/0146164 | A1 | 5/2023 | Labombard et al. | |

FOREIGN PATENT DOCUMENTS

| | | | | |
|---|---|---|---|---|
| JP | 2005184395 A | | 7/2005 | |
| JP | 2007214769 A | | 8/2007 | |
| JP | 2008078809 A | | 4/2008 | |
| JP | 2010213084 A | * | 9/2010 | ............ G03B 35/10 |
| JP | 2011015222 A | * | 1/2011 | ........... H04N 5/2354 |
| JP | 2019522594 A | | 8/2019 | |
| JP | 2019156122 A | | 9/2019 | |
| WO | 2018225710 A1 | | 12/2018 | |
| WO | 2021214261 A1 | | 10/2021 | |

OTHER PUBLICATIONS

Poth Miklos Ed—Anonymous. "Comparison of Convolutional Based Interpolation Techniques in Digital Image Processing" Intelligent Systems and Informatics, 2007. SISY 2007. 5th International Symposium On, IEEE, PI Aug. 1, 2007, pp. 87-90 ISBN: 978-1-4244-1442-0. XP031142321. p. 89, paragraph 4, first paragraph.

European Patent Office, International Search Report (with English translation) and Written Opinion of corresponding International Application No. PCT/EP2021/060606, dated Jun. 18, 2021.

* cited by examiner

METHOD FOR MANAGING IMAGE DATA, AND VEHICLE LIGHTING SYSTEM

CROSS-REFERENCE TO RELATED APPLICATIONS

This application is filed under 35 U.S.C. § 371 U.S. National Phase of International Application No. PCT/EP2021/060606 filed Apr. 22, 2021 (published as WO2021214260), which claims priority benefit to French Application No. 2004087 filed on Apr. 23, 2020, the disclosures of which are herein incorporated by reference in their entirety.

TECHNICAL FIELD

This invention relates to the field of vehicle lighting systems, and more particularly to managing image data for controlling a vehicle's light sources.

BACKGROUND OF THE INVENTION

Current lighting systems comprise, in particular, light sources that now make it possible to project a high-definition light beam. The desired projection of high-definition light can be obtained via the light sources and from images, or image patterns, that the sources receive in order to display them and thus project a given light beam. These images or image patterns can achieve very high resolutions now, in particular depending on the resolution of the light source used. By way of example, the light source can have at least 4 000 to 30 000 pixels, thus making it possible to generate a light beam from an image with this level of resolution.

To succeed in generating such high-definition light beams, multiple light sources can be used, or combined, which requires controlling them and finely synchronizing these sources in order to provide well-controlled, varied and adaptive lighting functionalities.

Vehicles therefore bear increasingly greater numbers of light sources, which use increasingly heavy high-definition image data, involving a large amount of data that must be managed by a vehicle control unit and communicated via a transmission means between the control unit and the one or more light sources. To do this, for example, a CAN protocol data bus is often used to transfer such data between the control unit and the light source. However, these data transmission means have the drawback of having a limited bandwidth, not allowing, for example, a bit rate of 2 to 5 Mbps to be exceeded in general. As a result, difficulties arise in transmitting the large amount of data required for said high-definition images over these limited networks. In addition, these networks are also used for the communication of other vehicle data, which means that the bandwidth available for high-definition image data can be even lower, for example limited to a range of 70 to 90% of the maximum bit rate possible over the data transmission network.

BRIEF SUMMARY OF THE INVENTION

By way of example, to communicate high-definition image data for the projection of a lighting function with a resolution of 20 000 pixels, the bit rate required over a CAN-FD transmission network would generally be 10 to 12 Mbps. However, such a CAN-FD network is currently actually limited to 5 Mbps (or even 2 Mbps in most cases). There is therefore a need to optimize the data transmitted over these networks, and in particular to compress the data that are communicated in order to transmit a stream of high-definition image data that is sufficient to ensure the one or more associated lighting functions, while observing the bit rate and bandwidth constraints of this same network.

Known compression methods have been considered to overcome this problem. However, they have all proven to be inadequate with respect to high-beam specificity, thereby hindering a sufficient reduction in the bandwidth as required by vehicle manufacturers.

To achieve this, provision could be made for multiple levels or iterations of data compression to be carried out, until succeeding in meeting a desired bandwidth. Still, such an approach has a very significant impact on the display quality of the projected lighting functions, since with each compression performed, display quality is affected; it is reduced.

However, for certain lighting functions, for example adaptive driving beams (ADBs) and road writing (RW), display quality cannot be overly degraded, as otherwise the user experience will be significantly lessened, with the light information projected by the light beam being made unclear, inadequate or even illegible.

A solution to these problems is therefore sought in order to overcome the drawbacks mentioned above.

According to a first aspect of the invention, the invention provides a solution to the stated problems by means of a method for managing image data in a vehicle lighting system, the lighting system comprising:
  at least one lighting module capable of projecting lighting functions on the basis of compressed image data, and
  a multiplexed bus for transmitting compressed image data to said at least one lighting module,
  the method comprising the following steps:
  receiving an instruction to trigger at least one lighting function, said at least one lighting function being configured to be generated by the at least one lighting module from compressed image data corresponding to lighting patterns comprising L rows, L being an integer,
  determining the image data to be compressed from among the image data of the lighting patterns of the at least one lighting function by selecting the image data of X rows from the L rows of the lighting patterns, X being an integer smaller than L,
  compressing the image data determined as having to be compressed;
  transmitting the compressed image data to said at least one lighting module via said multiplexed bus in order for the at least one lighting function to be generated and projected.

This method thus aims to compress only a portion of the lighting pattern image data in order to improve the compression capabilities for these patterns to be transmitted via the multiplexed bus. By reducing the number of rows whose image data is to be compressed and transmitted, it is then possible to:
  reduce the amount of image data to be communicated via the multiplexed bus,
  increase the level of image data compression while observing the maximum bandwidth allowed by the multiplexed bus,
  maintain good image quality, without having, for example, to degrade it significantly by further compressing the already compressed image data in order to succeed in observing the maximum bit rate of the multiplexed bus, ensure the transmission of high-definition image data over the multiplexed bus from which it is possible to reconstruct complete lighting patterns in a decompressing step.

According to one advantageous embodiment, in the determining step, the X rows that are selected are chosen according to a given recurrence among the L rows, every N rows, N being an integer smaller than L, and X being equal to L divided by N.

This embodiment makes it possible to have a selection of image data according to a chosen recurrence. This recurrence makes it possible to order the selection for compression and may, in particular, be taken into account in a step of decompressing the image data, in order to improve the accuracy of reconstruction of the rows among the L rows of the patterns which have not been compressed and transmitted.

In particular, N is equal to 2.

This embodiment makes it possible to generate lighting functions with a small loss of quality in the projected lighting patterns (in comparison with the initial quality of the lighting patterns before compression). Such an embodiment can be applied to all types of lighting functions, whether it concerns high-definition patterns (for example with a resolution from 4 000 to 30 000 pixels), or lower definition patterns (for example 2 500 pixels) or standard lighting function patterns (not high definition such as low beam or high beam).

Alternatively, N is equal to 3.

This embodiment makes it possible to further compress the image data of the patterns while maintaining a level of quality of the lighting patterns that are generated that is still sufficient for certain high-definition lighting functions, for example adaptive driving beams, and standard lighting functions such as low beam or high beam.

Alternatively again, N is greater than or equal to 4.

In this embodiment, the level of compression increases further. In this case, such an embodiment can make it possible to meet a specific need for high bandwidth over the multiplexed bus, even if it means degrading the display quality of certain non-critical lighting functions such as low beam or high beam.

Advantageously, the method further comprises a step of decompressing the compressed image data, wherein the lighting patterns to be projected are reconstructed from the compressed image data that are transmitted.

This decompressing step therefore aims to use the compressed image data that are transmitted to reconstruct the image data of the rows which have not been selected from among the L rows of lighting patterns at the time of the determining and compressing steps.

In particular, the decompressing step is based on reconstruction of lighting patterns through linearization between the image data of the X rows that are transmitted.

Alternatively or in combination, the decompressing step is based on reconstruction of lighting patterns through interpolation between the image data of the X rows that are transmitted.

According to one advantageous embodiment, the L rows correspond to the horizontal lines of the lighting patterns, each row of the L rows comprising at least one line of lighting pattern pixels.

According to one alternative, the L rows correspond to the vertical columns of the lighting patterns, each row of the L rows comprising at least one column of lighting pattern pixels.

According to one advantageous embodiment, the method further comprises the following steps:
   determining, for the generation of at least one lighting function, a bit rate level required to transmit the compressed image data for all of the L rows over said multiplexed bus,
   comparing the determined bit rate level with a bit rate threshold value of the multiplexed bus,
   wherein the steps of determining, compressing and transmitting the image data of the X rows are performed when said determined bit rate level is greater than said bit rate threshold value,
   and wherein the image data for all of the L rows is compressed and transmitted to said at least one lighting module via said multiplexed bus, when said determined bit rate level is lower than or equal to said bit rate threshold value.

In this embodiment, the steps of determining and compressing the image data of the X rows of lighting patterns are carried out only in the event that the bit rate over the multiplexed bus is insufficient to allow all of the compressed image data through the multiplexed bus (determined bit rate level higher than the bit rate threshold value). Otherwise, the image data for all of the L rows are transmitted when the bit rate available over the multiplexed bus allows it (determined bit rate level lower than or equal to the bit rate threshold value). Thus, it is possible to make the compression of the image data dynamic according to the bit rate available over the multiplexed bus.

According to an advantageous embodiment, in the instruction-receiving step, at least a first lighting function and a second lighting function are to be triggered, the first lighting function being configured to be applied to a first portion of the L rows of the lighting patterns, and the second lighting function being configured to be applied to a second portion of the L rows of the lighting patterns, distinct from the first portion, wherein the steps of determining, compressing and transmitting the image data of the X rows are performed within the first portion of the L rows of the lighting patterns, and wherein the image data associated with the second portion of the L rows of the lighting patterns are, as a whole, compressed and transmitted to said at least one lighting module via said multiplexed bus.

In this embodiment, the determining and compressing steps aimed at selecting and compressing only a portion of the image data of the lighting patterns to be projected are carried out only for a portion of the patterns. This makes it possible, in particular, to:
   target portions of patterns in which the associated lighting functions can effectively have only X compressed rows, such as the low beam, high beam and adaptive driving beam functions, for example,
   distinguish this portion from another portion of patterns for which the associated lighting functions cannot afford to lose display quality, such as road writing functions for example.

Advantageously, following the step of compressing the image data, the method further comprises steps of:
   determining, for the generation of at least one lighting function, a bit rate level required to transmit the compressed image data over said multiplexed bus,
   comparing the determined bit rate level with the bit rate threshold value of the multiplexed bus,
   transmitting, to said at least one lighting module via said multiplexed bus:

compressed image data when the determined bit rate level is lower than or equal to said bit rate threshold value, and image data of the last image transmitted via said multiplexed bus when the determined bit rate level is greater than said bit rate threshold value.

In this embodiment, in the event that the bit rate over the multiplexed bus is insufficient to allow the compressed image data through, provision is made to continue broadcasting the image data for the last displayed image in order to ensure that the light source will maintain a lighting function, for the safety of the driver and of other road users.

According to a second aspect of the invention, the invention also relates to a lighting system comprising:
- at least one lighting module capable of projecting lighting functions on the basis of compressed image data,
- a multiplexed bus for transmitting compressed image data to said at least one lighting module, and
- a control system configured to implement the method for managing image data as described above.

According to another advantageous embodiment, the control system comprises:
- a first control unit, provided with a processor unit, configured to:
- compress image data according to one of the first and second frequencies for generating the at least one lighting function,
- transmit, to said at least one lighting module via said multiplexed bus, the compressed image data,
- a second control unit, provided with a processor unit, configured to:
- receive compressed image data that are transmitted via said multiplexed bus,
- decompress the received image data,
- generate the at least one lighting function according to one of the first and second frequencies from the received and decompressed image data.

According to another advantageous embodiment, the at least one lighting module comprises at least one semiconductor light source, such as LEDs, and in particular a pixelated LED source.

In comparison with incandescent lighting, semiconductor lighting generates visible light with lower heat production and less energy dissipation. The generally low weight of a semiconductor electronic lighting device affords greater resistance to impacts and vibrations than brittle glass tubes/bulbs and long, thin filament wires. They are also not subject to filament evaporation, which may increase the service life of the lighting device. Some examples of these types of lighting comprise solid-state light-emitting diodes (LEDs), organic light-emitting diodes (OLEDs), or polymer light-emitting diodes (60 s) as light sources instead of electrical filaments, plasma or gas. The high-definition lighting functions may be provided by projecting one or more light beams projected by an LED source or a set of LEDs, or by a pixelated LED source.

Unless otherwise defined, all terms (including technical and scientific terms) used in this document should be interpreted in accordance with the standard practices of the profession. It is also understood that terms in common use are to be interpreted as customary in the relevant art and not in an idealized or overly formal sense, unless expressly defined as such herein.

In this text, the term "comprises" and derivatives thereof (such as "comprising", etc.) should not be understood in an exclusive sense, i.e. these terms should not be interpreted as excluding the possibility that what is described and defined may include other elements, steps, etc.

BRIEF DESCRIPTION OF THE DRAWINGS

To supplement the description and to allow better understanding of the invention, a set of drawings is provided. These drawings form an integral part of the description and illustrate one embodiment of the invention, which should not be interpreted as limiting the scope of the invention, but merely as an example of how the invention may be carried out. The drawings comprise the following figures.

DETAILED DESCRIPTION OF THE INVENTION

In these figures, the following references have been used:
2 Low-beam lighting function
4 High-beam lighting function
6 Adaptive driving beam lighting function
8 Road writing lighting function
10 Lighting system
20 Control system
30 Lighting function driver module
40 Multiplexed data transmission bus
50 Lighting module
60, 62, 64, 66, 68 Semiconductor light source
70 First control unit
72 Second control unit
80 First processor unit
82 Second processor unit
52 First lighting module
54 Second lighting module
100 Instruction-receiving step
110 Determining step
120 Comparing step
140 Step of compressing image data
150 Transmitting compressed image data
160 Step of decompressing compressed image data
130 Step of comparing the bit rate required to transmit image data
300 Lighting pattern
310 Selected rows 320 Lighting pattern rows
322 First portion of the L rows
324 Second portion of the L rows
90 Vehicle-to-vehicle lighting device
95 Lighting optic The exemplary embodiments are described in sufficient detail to allow those of ordinary skill in this art to carry out and implement the systems and methods described herein. It is important to understand that these embodiments may be provided in a number of alternative forms and should not be construed as being limited to the examples presented here.

Consequently, although the embodiments may be modified in various ways and take various alternative forms, specific embodiments thereof are shown in the drawings and described in detail below by way of example. No limitation to the particular examples disclosed is intended. Rather, all modifications, equivalents and alternatives falling within the scope of the appended claims are to be included.

Figure 1:
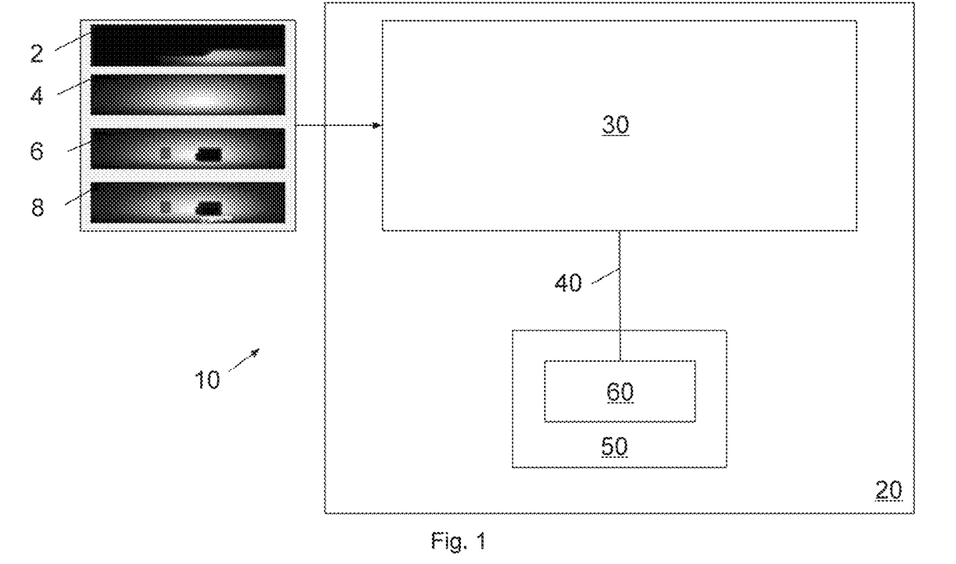
FIG. 1 shows a first embodiment of the lighting system according to the invention.

Reference is first made to FIG. 1 which shows a first embodiment of the lighting system 10 according to the invention. The lighting system 10 comprises in particular:
- at least one lighting module 50 capable of projecting lighting functions on the basis of compressed image data,
- a multiplexed bus 40 for transmitting compressed image data to the lighting module 50, and
- a control system 20 configured to implement the method for managing image data as proposed, with a view to generating given lighting functions.

To this end, the control system 20 may receive instructions from a vehicle control unit (not shown in the figures) to generate each of the lighting functions independently of each other or, conversely, in combination. For example, the lighting functions may be combined with each other in pairs. According to another example, three or four lighting functions, or even all of the possible lighting functions, may be combined with each other.

The vehicle control unit may generate the instructions for generating lighting functions from a lighting command given by the driver, or from a lighting command determined by a detection unit, such as a camera or a light detector.

The instructions received by the control system 20 may, in particular, be instructions for generating a light beam corresponding to the following lighting functions:
- Low beam 2 (LB),
- High beam 4 (HB),
- Adaptive driving beam 6 (ADB), or
- Road writing 8 (RW).

What is meant by adaptive driving beam 6 is any lighting function that allows the lighting beam to be varied dynamically in order to adapt it to vehicle traffic situations. For example, this may relate to a function in which the lighting is projected with high-beam type photometry while avoiding dazzling other road users. As a variant or in addition, the function may relate to:
- a photometry that allows dynamic directional lighting, in other words a horizontal displacement of the maximum intensity of an LB 2 or HB 4 photometry depending on the rotational angle of the steering wheel of a motor vehicle (also known as DBL for dynamic bending light);
- lighting that makes it possible to avoid glare from road signs as a result of the projection of light beams from the motor vehicle (also known as TSAG for traffic sign anti-glare);
- lighting that allows the projection of line-type patterns on the road, in particular to delimit a portion of road to be taken by the motor vehicle or to present an obstacle avoidance strategy (also known as LA for line assist).

What is meant by road writing 8 is any lighting function that allows the projection on the road of patterns visible to the driver and/or road users, in particular driving aids, signaling symbols or other indicators for navigation, for example.

The control system 20 may further comprise a driver module 30 for driving the vehicle's light sources, which is able to receive the instructions for generating lighting functions and to control the vehicle's light sources so as to generate the desired light beam for the requested lighting function. To do this, the control module 30 may, in particular, interface with the multiplexed bus 40 to transmit the required image data to the lighting module 50 in order to project the desired lighting functions.

The multiplexed bus may be chosen from any data transmission bus known in the vehicle field, and in particular a CAN or CAN-FD protocol data bus.

To generate light beams associated with lighting functions to be triggered, the lighting module 50 comprises at least one light source, and in particular a semiconductor light source 60, such as LEDs, and in particular a pixelated LED source.

In this way, the lighting system 10 is able to cause light beams to be projected by the light source 60 based on compressed image data received via the multiplexed bus 40. In addition, the lighting system 10 aims to compress the image data via the control system 20, for example at the level of the driver module 30, according to the desired lighting functions and the implementation of the proposed method for managing image data.

Figure 2:
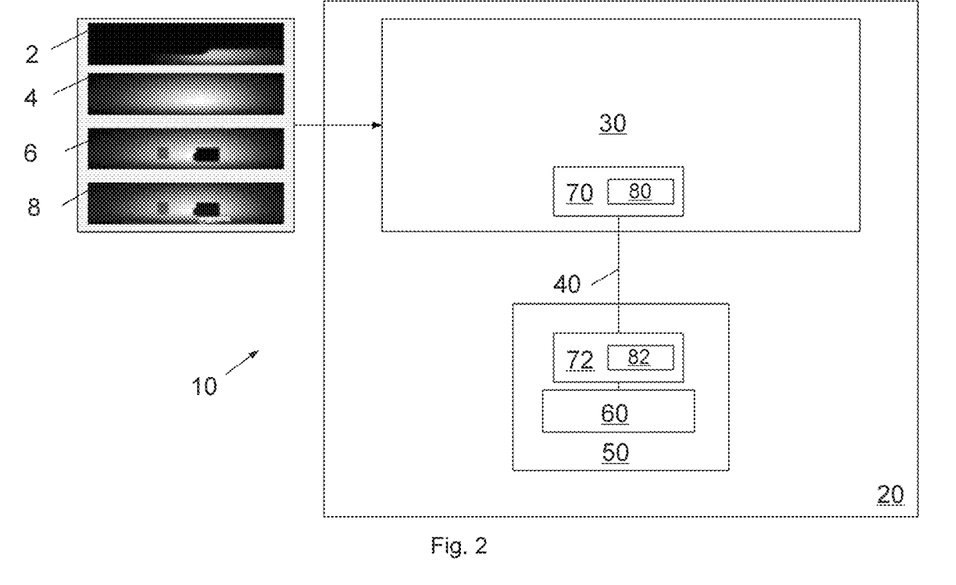
FIG. 2 shows a second embodiment of this lighting system.

Reference is now made to FIG. 2 which shows a second embodiment of the lighting system 10, in which the control system 20 further comprises:
- a first control unit 70 (for example integrated into the driver module 30) equipped with a processor unit 80 configured to:
- compress image data for lighting functions LB 2, HB 4, ADB 6, RW 8,
- transmit the compressed image data to the lighting module 50 via the multiplexed bus 40,
- a second control unit 72 (for example integrated into the lighting module 50) equipped with a processor unit 82 configured to:
- receive compressed image data that are transmitted via said multiplexed bus 40,
- decompress the received image data,
- generate the at least one lighting function HB 4, ADB 6, RW 8 based on the received and decompressed image data.

Figure 3:
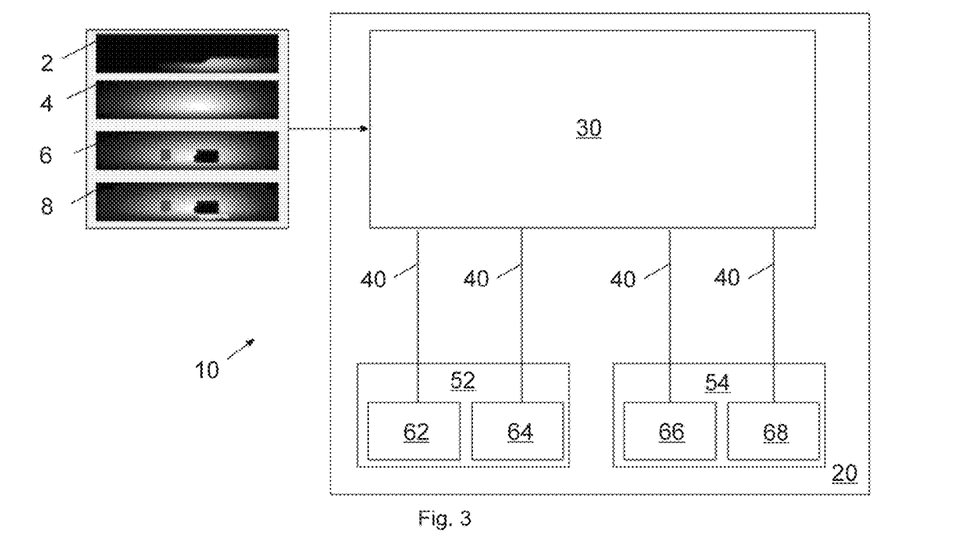
FIG. 3 shows a third embodiment of this lighting system.

Reference is now made to FIG. 3 which shows a third embodiment of the lighting system 10 in which the control system 20 comprises a first lighting module 52 and a second lighting module 54, which may be configured to be:
- each integrated into a different headlamp of the vehicle, for example the first module 52 into the right headlamp of the vehicle and the second module 54 into the left headlamp of the vehicle;
- integrated into one and the same headlamp of the vehicle.

In addition, each module 52 and 54 may comprise a plurality of light sources 62, 64, 66, 68 to allow the light beams of the desired lighting functions LB 2, HB 4, ADB 6, RW 8 to be generated. The light sources 62, 64, 66, 68 may, in particular, be semiconductor light sources 60, such as LEDs, and in particular pixelated LED sources, for example having a resolution of 2 500, 4 000 or 20 000 pixels.

To compress the image data, the desired compression rate is preferably higher than or equal to 75%, or even more preferably higher than or equal to 85%. This is because a compression of at least 75% is a compression rate that allows image data for a high-definition lighting feature, or a combination of high-definition lighting features, to go over bandwidth-limited vehicle-to-vehicle transmission buses, such as the multiplexed bus 40.

Figure 4A:
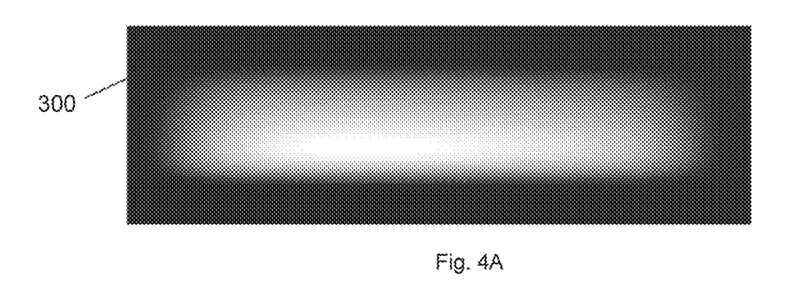
FIGS. 4A, 4B and 4C illustrate some examples of lighting patterns to be projected by the lighting system to provide a lighting function.
Figure 4B:
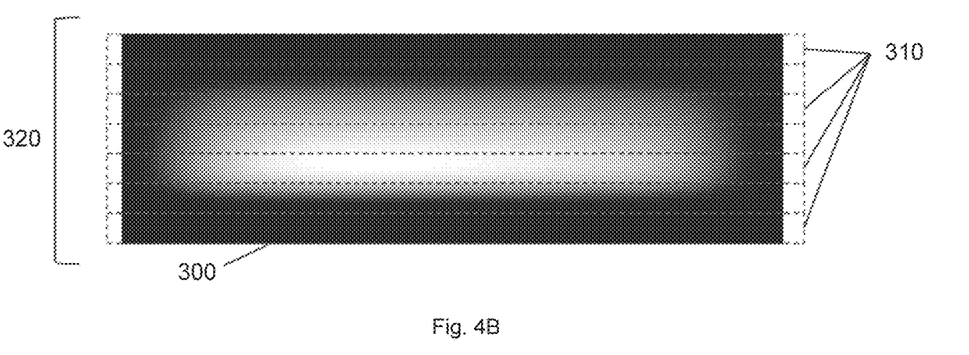
Figure 4C:
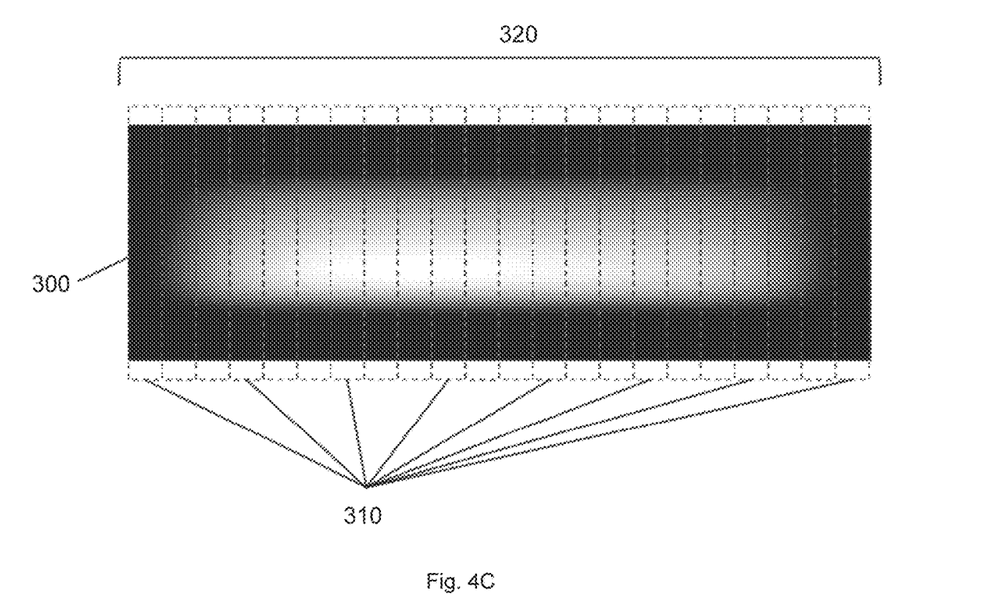

Reference is now made to FIG. 4A, FIG. 4B and FIG. 4C which illustrate some examples of lighting patterns 300 to be projected by the lighting system 10 to provide a lighting function, here a high-beam function HB 4.

The illustrated lighting pattern 300 is divided into L rows 320, where L is an integer.

According to one embodiment illustrated in FIG. 4B, each row of the L rows 320 comprises at least one line of lighting pattern pixels. According to one possible embodiment, each row corresponds to a single line of pixels of the pattern. According to one possible variant, each row corresponds to a group of lines of pixels of the pattern. The L rows 320 may, for example, then correspond to groups of 2 to 10 lines of pixels for example.

According to one embodiment illustrated in FIG. 4C, each row of the L rows 320 comprises at least one column of lighting pattern pixels. According to one possible embodiment, each row corresponds to a single column of pixels of the pattern. According to one possible variant, each row corresponds to a group of columns of pixels of the pattern.

From among the L rows 320 of the lighting pattern 300, the method for managing image data makes it possible to select only a portion of the L rows 320 for the compression of image data, in this case X rows 310 from among the L rows 320, X being an integer smaller than L.

Figure 5A:
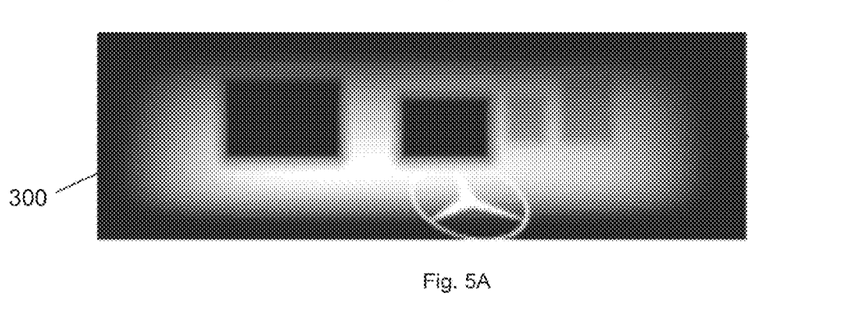
FIGS. 5A, 5B and 5C illustrate other examples of lighting patterns to be projected by the lighting system to provide other lighting functions.
Figure 5B:
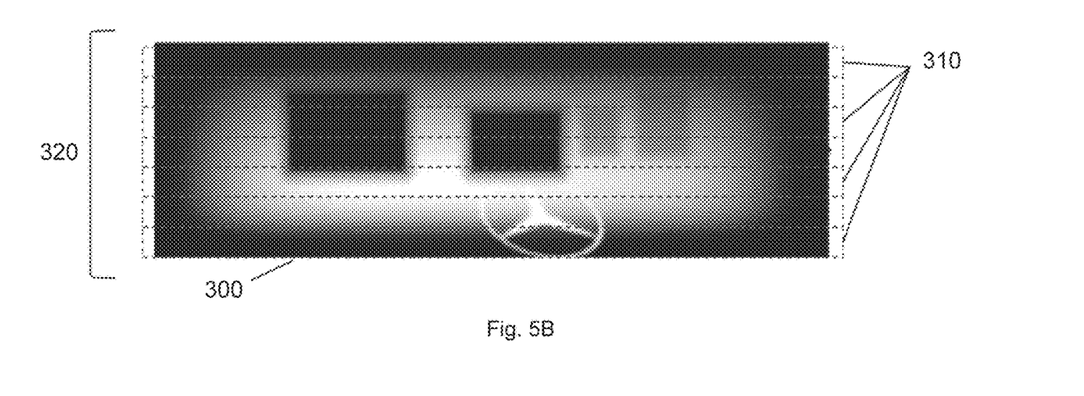
Figure 5C:
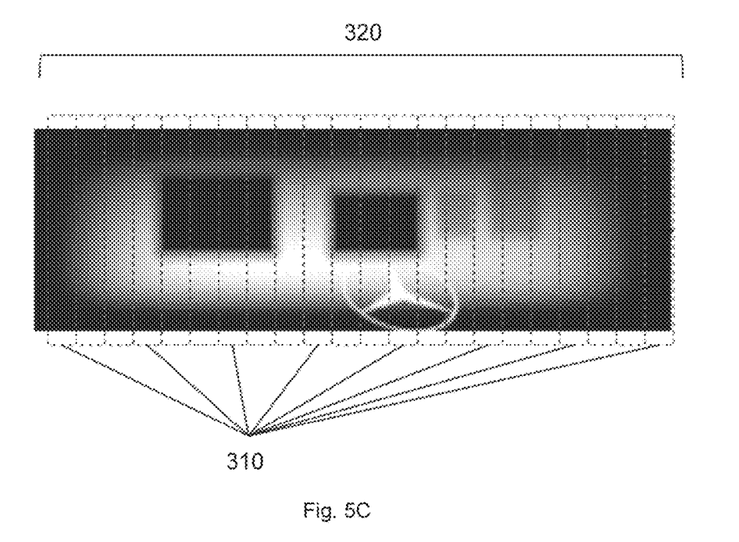

According to another possible example of lighting function projection, FIG. 5A, FIG. 5B and FIG. 5C illustrate the X rows 310 chosen from among the L rows 320 of lighting patterns 300 to provide the projection of the combination of lighting functions such as adaptive driving beam 6 and road writing 8.

Figure 6:
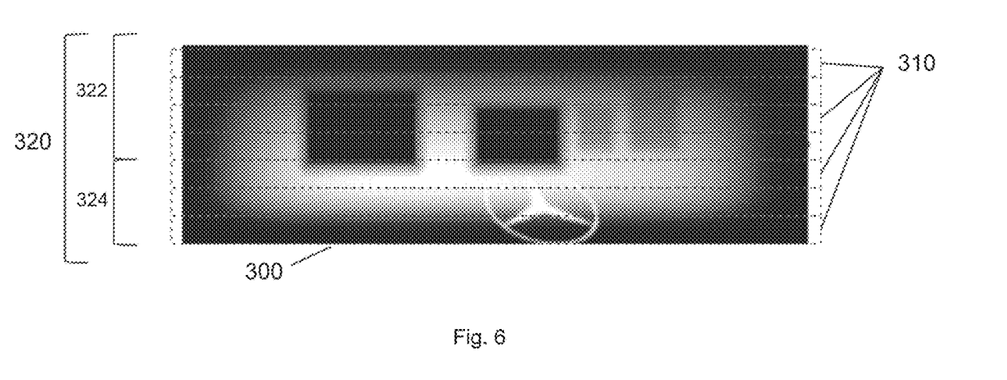
FIG. 6 illustrates the example of lighting patterns of FIG. 5B according to another embodiment.

Reference is now made to FIG. 6 which illustrates one embodiment in which a first portion 322 of the L rows of lighting pattern 300 is provided for the projection of a first lighting function (such as the ADB 6 function) and a second portion 324 of the L rows 320 is provided for the projection of a second lighting function (such as the RW 8 function). The selection of X rows 310 of image data to be compressed may be made from among only one or the other of the first portion 322 and second portion 324 of L rows 320 or, alternatively, from both portions 322 and 324.

Figure 7:
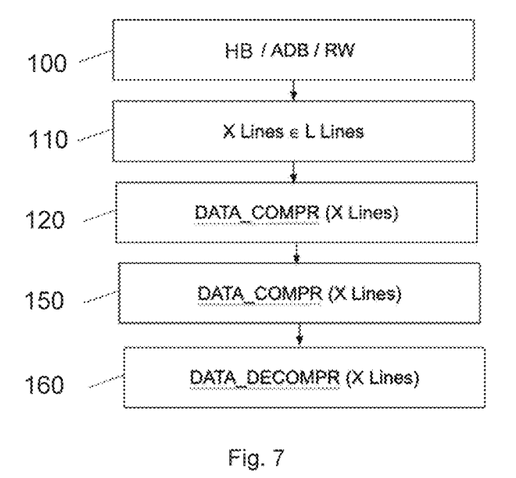
FIG. 7 shows a first representation of steps of the method for managing image data according to the invention.

Reference is now made to FIG. 7 which shows a representation of the steps of the method for managing image data according to the invention. The method comprises, in particular, the following steps:

receiving 100 an instruction to trigger at least one lighting function HB 4, ADB 6, RW 8, the lighting function being configured to be generated by the lighting module 50 from compressed image data corresponding to the lighting patterns 300 comprising L rows 320, L being an integer, determining 110 the image data to be compressed from among the image data of the lighting patterns 300 of the lighting function HB 4, ADB 6, RW 8 by selecting the image data of X rows 310 from the L rows 320 of the lighting patterns, X being an integer smaller than L, compressing 160 the image data determined as having to be compressed, transmitting 150 the compressed image data to the lighting module 50 via the multiplexed bus 40 in order for the lighting function HB 4, ADB 6, RW 8 to be generated and projected.

Thus, the quantity of data to be compressed and transmitted is reduced by virtue of the selection of the X rows 310 from among the L rows 320.

In particular, in the determining 110, the X rows 310 that are selected may be chosen according to a given recurrence among the L rows 320. This given recurrence may be defined every N rows, N being an integer smaller than L, and X being equal to L divided by N.

As illustrated in FIG. 4B or in FIG. 5B, the chosen recurrence may be equal to N=2, which means that only one row of data out of two from among the L rows 320 will be chosen for compression. This embodiment makes it possible to generate lighting functions with a small loss of quality in the projected lighting patterns (in comparison with the initial quality of the lighting patterns before compression).

As illustrated in FIG. 4C or in FIG. 5C, the chosen recurrence may be equal to N=3, which means that only one row of data out of three from among the L rows 320 will be chosen for compression. This embodiment makes it possible to further compress the image data of the patterns while maintaining a level of quality of the lighting patterns that are generated that is still sufficient for certain high-definition lighting functions, for example adaptive driving beams 6, and standard lighting functions such as low beam 2 or high beam 4.

N may also be chosen to be greater than or equal to 4. In this embodiment, the level of compression increases further. In this case, such an embodiment can make it possible to meet a specific need for high bandwidth over the multiplexed bus 40, even if it means degrading the display quality of certain non-critical lighting functions such as low beam 2 or high beam 4.

The method further comprises decompressing 130, in which the lighting patterns to be projected are reconstructed from the compressed image data that are transmitted 150. This decompression 130 aims to use the compressed image data that are transmitted to reconstruct the image data of the rows which have not been selected from among the L rows 320 of lighting patterns at the time of the determining and compressing.

This reconstruction may be carried out using various techniques, in particular interpolation or linearization of the image data values between the image data of the X rows 310 that are transmitted. Other techniques may be envisaged for reconstructing the image data which have not been retained or transmitted following the selection step, such as, for example:

linear interpolation of the sub-ranges between the image data of the X rows 310 that are transmitted, polynomial interpolation between the image data of the X rows 310 that are transmitted.

interpolation using the Bézier method of the sub-ranges between the image data of the X rows 310 that are transmitted, interpolation using the parameter-adaptation method of the sub-ranges between the image data of the X rows 310 that are transmitted, interpolation using the method of least squares of the sub-ranges between the image data of the X rows 310 that are transmitted, interpolation using the exponential modeling method of the sub-ranges between the image data of the X 310 rows that are transmitted, interpolation using the Fourier series method of the sub-ranges between the image data of the X 310 rows that are transmitted, interpolation using the Gaussian modeling method of the sub-ranges between the image data of the X 310 rows that are transmitted, interpolation using the power series method of the sub-ranges between the image data of the X rows 310 that are transmitted, interpolation using the sum of sine models method of the sub-ranges between the image data of the X rows 310 that are transmitted, interpolation using the Weibull distribution method of the sub-ranges between the image data of the X rows 310 that are transmitted, interpolation using the personalized models method of the sub-ranges between the image data of the X 310 rows that are transmitted.

Figure 8:
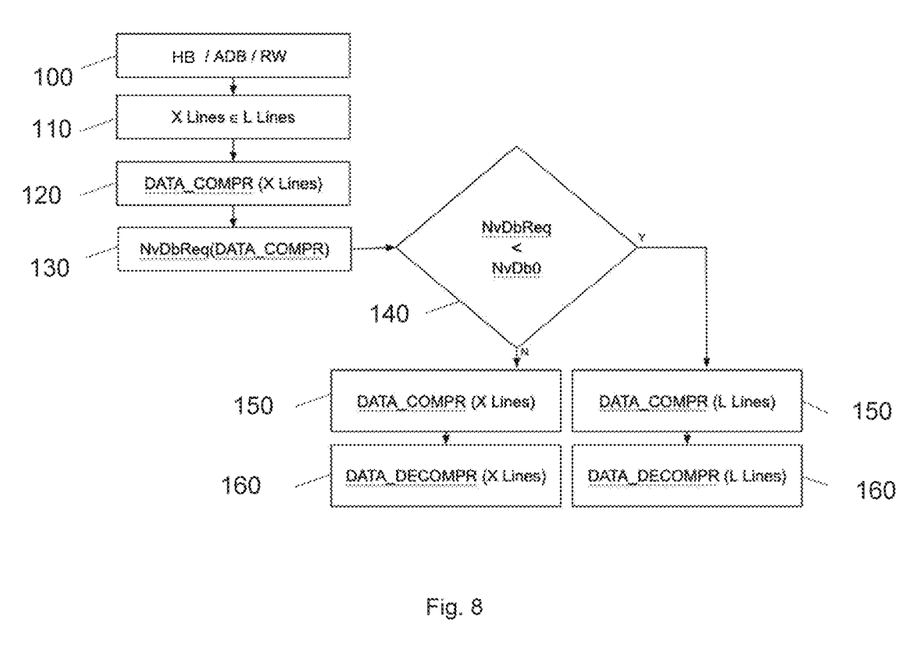
FIG. 8 shows a second representation of steps of the method for managing image data, comprising additional steps to the first representation of FIG. 7.

Reference is now made to FIG. 8 which shows a second representation of the method for managing image data, comprising elements to the first representation of FIG. 7.

In this embodiment, the method further comprises:

determining 130, for the generation of the lighting function HB 4, ADB 6, RW 8, a bit rate level required (NvDbReq) to transmit the compressed image data for all of the L rows 320 over the multiplexed bus 40, comparing 160 the determined bit rate level (NvDbReq) with a bit rate threshold value (NvDb0) of the multiplexed bus 40, wherein determining 110, compressing 140 and transmitting 150 the image data of the X rows 310 are performed when said determined bit rate level (NvDbReq) is greater than said bit rate threshold value (NvDb0), and wherein the image data for all of the L rows 320 is compressed and transmitted to said at least one lighting module 50 via said multiplexed bus 40, when said determined bit rate level (NvDbReq) is lower than or equal to said bit rate threshold value (NvDb0).

In this example, the determining 110 and compressing 140 the image data of the X rows 310 of lighting patterns are carried out only in the event that the bit rate over the multiplexed bus 40 is insufficient to allow all of the compressed image data through the multiplexed bus 40 (determined bit rate level higher than the bit rate threshold value). Otherwise, the image data for all of the L rows 320 are transmitted when the bit rate available over the multiplexed bus 40 allows it (determined bit rate level lower than or equal to the bit rate threshold value). Thus, it is possible to make the compression of the image data dynamic according to the bit rate available over the multiplexed bus.

Furthermore, in accordance with the exemplary embodiment of FIG. 6, the instruction-receiving step, the first lighting function ADB 6 may be configured to be applied to the first portion 322 of the L rows 320 of the lighting patterns, and the second lighting function RW 8 is configured to be applied to a second portion 324 of the L rows 320 of the lighting patterns, distinct from the first portion 322. The steps of determining 130, compressing 140 and transmitting 150 the image data for the X rows 310 are carried out within the first portion 322 of the L rows 320 of the lighting patterns, and wherein the image data associated with the second portion 324 of the L rows 320 of the lighting patterns are, as a whole, compressed and transmitted to said at least one lighting module 50 via said multiplexed bus 40.

In this embodiment, the determining 110 and compressing 140 aimed at selecting and compressing only a portion of the image data of the lighting patterns to be projected are carried out only for a portion of the patterns. This makes it possible, in particular, to:

target portions of patterns in which the associated lighting functions can effectively have only X compressed rows, such as the low beam 2, high beam 4 and adaptive driving beam 6 functions, for example, distinguish this portion from another portion of patterns for which the associated lighting functions cannot afford to lose display quality, such as road writing 8 functions for example.

According to one embodiment (not illustrated), following the compressing the image data, the method further comprises:

determining, for the generation of at least one lighting function, a bit rate level required to transmit the compressed image data over said multiplexed bus 40, comparing the determined bit rate level with the bit rate threshold value of the multiplexed bus 40, transmitting, to said at least one lighting module 50 via the multiplexed bus 40:

compressed image data when the determined bit rate level is lower than or equal to said bit rate threshold value, and image data of the last image transmitted via said multiplexed bus 40 when the determined bit rate level is greater than said bit rate threshold value.

In this embodiment, in the event that the bit rate over the multiplexed bus is insufficient to allow the compressed image data through, provision is made to continue broadcasting the image data for the last displayed image in order to ensure that the light source will maintain a lighting function, for the safety of the driver and of other road users.

Figure 9:
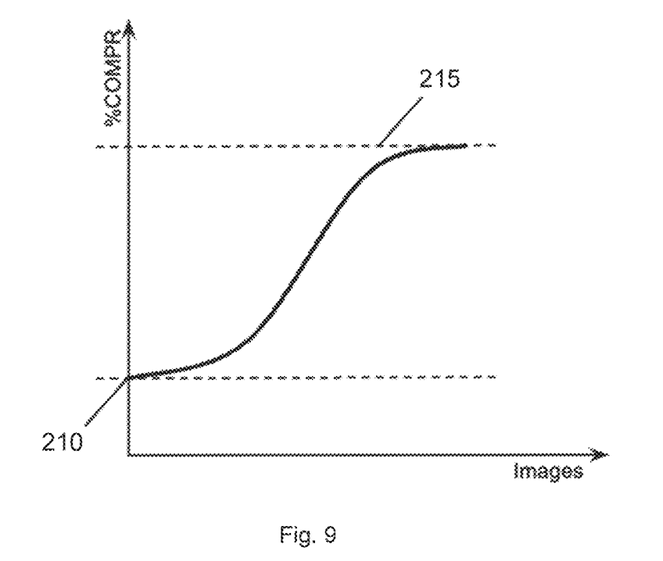
FIG. 9 shows the result on the compression rate obtained by virtue of the selection of image data to be compressed when the method according to the invention is used.

Reference is now made to FIG. 9 which shows the result on the compression rate that is obtained when the method according to the invention is used. By selecting X rows from among the L rows, the amount of image data to be compressed is reduced. As such, the compression rate 210 (COMPR1) required to compress the lighting function may be improved, and go from an initial value COMPR1 210 to an improved compression rate value 215 (COMPR2), which has a higher value than COMPR1 210.

By virtue of the method, it is then possible to:

reduce the amount of image data to be communicated via the multiplexed bus, increase the level of image data compression while observing the maximum bandwidth allowed by the multiplexed bus, maintain good image quality, without having, for example, to degrade it significantly by further compressing the already compressed image data in order to succeed in observing the maximum bit rate of the multiplexed bus, ensure the transmission of high-definition image data over the multiplexed bus from which it is possible to reconstruct complete lighting patterns in a decompressing step.

Figure 10:
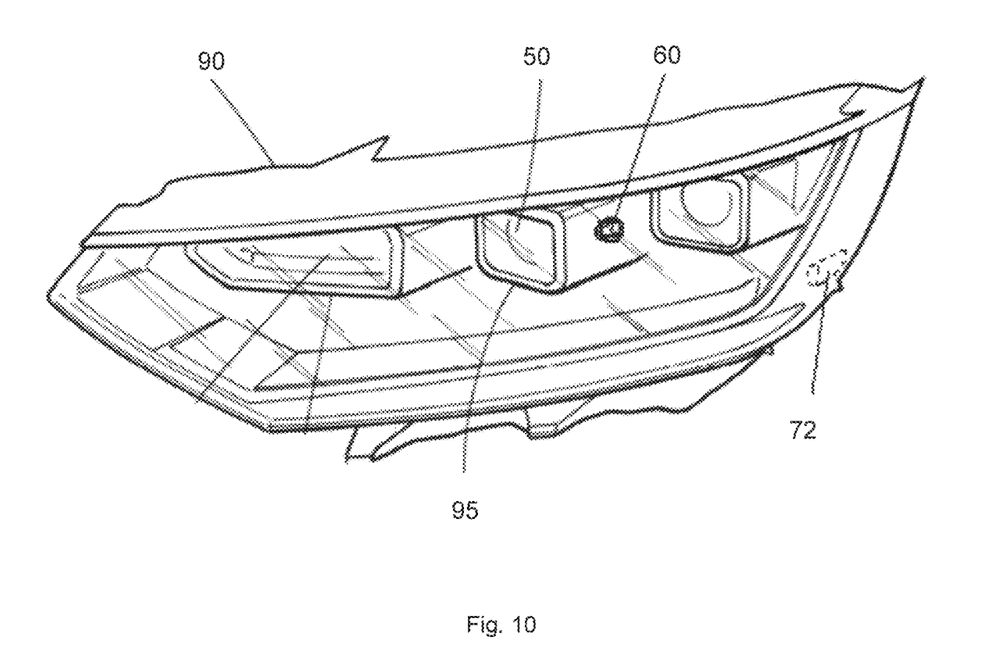
FIG. 10 shows a vehicle lighting device comprising at least a portion of the lighting system according to the invention.

Reference is now made to FIG. 10 which shows a front-headlamp vehicle lighting device 90, this lighting device 90 comprising:

the lighting module 50 comprising at least one light source 60;

an optic 95 associated with the light source 60 to generate light beams for desired lighting functions;

the control unit 72 to perform the steps of receiving and decompressing the compressed image data.

The invention has been described with reference to particular embodiments, which are not limiting. Of course, the present invention is not limited to the embodiment described by way of an example and it extends to other alternative embodiments.

For example, the invention could also apply to a lighting system comprising at least one vehicle taillight and/or one vehicle signaling light and/or one vehicle interior lighting module with a view to generating the lighting functions associated therewith while benefiting from the advantages proposed by and obtained using the invention by means of the technique of compressing image data according to a dynamic display frequency.

What is claimed is:

1. A method of managing image data in a vehicle lighting system, comprising:
providing at least one lighting module capable of projecting lighting functions on a basis of a compressed image data and a multiplexed bus for transmitting the compressed image data to the at least one lighting module;
receiving an instruction that is configured to trigger at least one lighting function, the at least one lighting function configured to be generated by the at least one lighting module from the compressed image data corresponding to lighting patterns including L rows, with L being an integer;
making a determination of an image data to be compressed from among the image data of the lighting patterns of the at least one lighting function by selecting the image data of X rows from the L rows of the lighting patterns, X being an integer smaller than L,
compressing the determination of the image data determined as having to be compressed,
wherein the determination includes the X rows that are selected to be chosen according to a given recurrence among the L rows for an N row, where N is an integer smaller than L, and X being equal to L divided by N; and
transmitting the compressed image data to the at least one lighting module via the multiplexed bus in order for the at least one lighting function to be generated and projected.

2. The method of claim 1, wherein N is equal to 2.

3. The method of claim 1, wherein N is equal to 3.

4. The method of claim 1, wherein N is greater than or equal to 4.

5. The method of claim 1, further comprising decompressing the compressed image data, wherein the lighting patterns to be projected are reconstructed from the compressed image data that are transmitted.

6. The method of claim 5, wherein the decompressing is based on reconstruction of lighting patterns through linearization between the image data of the X rows that are transmitted.

7. The method of claim 5, wherein the decompressing is based on reconstruction of lighting patterns through interpolation between the image data of the X rows that are transmitted.

8. The method of claim 1, wherein the L rows correspond to the horizontal lines of the lighting patterns, with each row of the L rows comprising at least one line of lighting pattern pixels.

9. The method of claim 1, wherein the L rows correspond to the vertical columns of the lighting patterns, with each row of the L rows comprising at least one column of lighting pattern pixels.

10. The method of claim 1, further comprising:
making a determination for a generation of at least one lighting function and a bit rate level required to transmit the compressed image data for all of the L rows over the multiplexed bus;
comparing the bit rate level required with a bit rate threshold value of the multiplexed bus;
wherein the determination, a compressing and a transmitting the compressed image data of the X rows are performed when the bit rate level required is greater than the bit rate threshold value; and
wherein the image data for all of the L rows is compressed and transmitted to the at least one lighting module via the multiplexed bus, when the bit rate level required is lower than or equal to a bit rate threshold value.

11. The method of claim 1, wherein, in the instruction includes at least a first lighting function and a second lighting function are to be triggered,
the first lighting function being configured to be applied to a first portion of the L rows of the lighting patterns, and
the second lighting function being configured to be applied to a second portion of the L rows of the lighting patterns, distinct from the first portion,
wherein the determining, compressing and transmitting the image data of the X rows are performed within the first portion of the L rows of the lighting patterns,
and wherein the image data associated with the second portion of the L rows of the lighting patterns are, as a whole, compressed and transmitted to the at least one lighting module via the multiplexed bus.

12. The method of claim 1, further comprising:
making a determination for a generation of at least one lighting function;
making a determination for a bit rate level required to transmit the compressed image data over the multiplexed bus;
comparing the bit rate level required with a bit rate threshold value of the multiplexed bus;
transmitting, to the at least one lighting module via the multiplexed bus;
providing compressed image data when the bit rate level required is lower than or equal to the bit rate threshold value, and
providing image data of the last image transmitted via the multiplexed bus when the bit rate level required is greater than the bit rate threshold value.

13. A vehicle lighting system comprising:
at least one lighting module capable of projecting lighting functions on a basis of a compressed image data;
a multiplexed bus for transmitting the compressed image data to the at least one lighting module, and
a control system configured to:
receive an instruction to trigger at least one lighting function, the at least one lighting function being configured to be generated by the at least one lighting module from the compressed image data corresponding to lighting patterns including L rows, with L being an integer;
making a determination of an image data to be compressed from among the image data of the lighting patterns of the at least one lighting function—by selecting the image data of X rows from the L rows of the lighting patterns, X being an integer smaller than L;
compressing the determination of the image data to be compressed; and transmitting the compressed image data to the at least one lighting module—via the multiplexed bus in order for the at least one lighting function to be generated and projected.

14. The vehicle lighting system as claimed in claim 13, wherein the at least one lighting module includes a pixelated LED source.

\* \* \* \* \*